US012781624B2

(12) United States Patent
Shakirov et al.

(10) Patent No.: US 12,781,624 B2
(45) Date of Patent: Nov. 3, 2026

(54) METHOD FOR DETERMINING PHYSICAL PROPERTIES OF ROCKS AND ROCK MATRIX FROM DRILLING DATA, MUD GAS DATA, AND DRILL CUTTINGS IMAGES

(71) Applicant: SAUDI ARABIAN OIL COMPANY, Dhahran (SA)

(72) Inventors: Anuar Shakirov, Moscow (RU); Leyla Ismailova, Moscow (RU); Mokhles Mezghani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 267 days.

(21) Appl. No.: 18/707,972

(22) PCT Filed: Aug. 16, 2022

(86) PCT No.: PCT/RU2022/000255

§ 371 (c)(1),
(2) Date: May 7, 2024

(87) PCT Pub. No.: WO2024/039260

PCT Pub. Date: Feb. 22, 2024

(65) Prior Publication Data

US 2024/0426211 A1 Dec. 26, 2024

(51) Int. Cl.

*E21B 49/00* (2006.01)
*E21B 21/08* (2006.01)
(Continued)

(52) U.S. Cl.

CPC ............ *E21B 49/005* (2013.01); *E21B 44/00* (2013.01); *G06T 7/0002* (2013.01); *E21B 21/08* (2013.01);
(Continued)

(58) Field of Classification Search

CPC ........ E21B 49/005; E21B 44/00; E21B 21/08; E21B 2200/22; G06T 7/0002;
(Continued)

(56) References Cited

U.S. PATENT DOCUMENTS

| | | | | |
|---|---|---|---|---|
| 6,424,919 B1 * | 7/2002 | Moran | E21B 44/00 702/6 | |
| 2013/0301794 A1 | 11/2013 | Grader et al. | | |

(Continued)

FOREIGN PATENT DOCUMENTS

| | | |
|---|---|---|
| CA | 3035734 A1 | 9/2020 |
| EP | 2 772 775 A1 | 9/2014 |

(Continued)

OTHER PUBLICATIONS

Kanfar, R, et al., "Real-time well log prediction from drilling data using deep learning," In International Petroleum Technology Conference; 2020 (12 pages).

(Continued)

*Primary Examiner* — Peter J Macchiarolo
*Assistant Examiner* — John M Royston
(74) *Attorney, Agent, or Firm* — Osha Bergman Watanabe & Burton LLP

(57) ABSTRACT

A method and a system for predicting physical properties of rock are disclosed. The method includes obtaining digital images of drill cuttings and data on drilling parameters and mud gas content and inputting of the obtained digital images of the drill cuttings to a first trained artificial intelligence model to determine the physical properties of a rock matrix and a lithological composition of the drill cuttings. The data on the lithological content of the drill cuttings, the drilling parameters, and the mud gas data are inputted to a second trained artificial intelligence model to determine a total porosity, an effective porosity, and a saturation of rocks.
(Continued)

Additionally, the method includes inputting of the data on the total porosity, the effective porosity, and the saturation of the rocks, and the physical properties of the rock matrix to a rock-physics model to determine the physical properties of the rocks.

15 Claims, 4 Drawing Sheets

(51) Int. Cl.

| | |
|---|---|
| ***E21B 44/00*** | (2006.01) |
| ***G01N 15/08*** | (2006.01) |
| ***G06F 30/27*** | (2020.01) |
| ***G06F 113/08*** | (2020.01) |
| ***G06N 3/0464*** | (2023.01) |
| ***G06N 3/084*** | (2023.01) |
| ***G06N 20/20*** | (2019.01) |
| ***G06T 7/00*** | (2017.01) |

(52) U.S. Cl.
CPC ........ *E21B 2200/22* (2020.05); *G01N 15/088* (2013.01); *G06F 30/27* (2020.01); *G06F 2113/08* (2020.01); *G06N 3/0464* (2023.01); *G06N 3/084* (2013.01); *G06N 20/20* (2019.01); *G06T 2207/20084* (2013.01); *G06T 2207/30181* (2013.01)

(58) Field of Classification Search
CPC ........... G06T 2207/20084; G06T 2207/30181; G06N 3/084; G06N 3/0464; G06N 20/20; G06F 2113/08; G06F 30/27; G01N 15/088
USPC ........................................................ 73/152.11
See application file for complete search history.

(56) References Cited

U.S. PATENT DOCUMENTS

| | | | |
|---|---|---|---|
| 2015/0000903 A1 | 1/2015 | Ly et al. | |
| 2020/0340907 A1 * | 10/2020 | Allo | G06T 7/001 |

FOREIGN PATENT DOCUMENTS

| | | | |
|---|---|---|---|
| RU | 2650706 C1 | 4/2018 |
| WO | 2013/169137 A1 | 11/2013 |
| WO | 2022026879 A1 | 2/2022 |

OTHER PUBLICATIONS

Al-Abduljabbar, A., et al., “Estimation of Reservoir Porosity From Drilling Parameters Using Artificial Neural Networks,” Petrophysics 61 (2020): pp. 318-330 (13 pages).

International Search Report issued for corresponding international patent application No. PCT/RU2022/000255, mailed May 11, 2023 (3 pages).

Written Opinon issued for corresponding international patent application No. PCT/RU2022/000255, mailed May 11, 2023 (5 pages).

Hany Gamal, et al., “Intelligent Prediction for Rock Porosity While Drilling Complex Lithology in Real Time;” Computational Intelligence and Neuroscience; vol. 2021; Jun. 15, 2021 (12 pages).

* cited by examiner

METHOD FOR DETERMINING PHYSICAL PROPERTIES OF ROCKS AND ROCK MATRIX FROM DRILLING DATA, MUD GAS DATA, AND DRILL CUTTINGS IMAGES

BACKGROUND

Data on physical properties of rocks are of a key importance for many applied tasks in petroleum engineering including an interwell correlation, determining rock porosity and permeability, an interpretation of seismic data, etc. The data on physical properties of rocks composing the geological profile of a certain well can be obtained from laboratory measurements on core samples or by means of well-logging. In most cases, the full suite of well-logging data, as well as core samples, are available only within certain target layers of the investigated field or a reservoir. Additionally, due to technical reasons, the logging data can be of a bad quality. Concurrently, the data on drilling parameters and mud gas content as well as drill cuttings are available almost in all wells starting from the top to bottom. Data on drilling parameters, mud gas content, and description of rock cuttings are indirectly connected with the physical properties of rocks at in situ conditions. What is needed is a way to predict physical properties of rocks and rock matrix from these indirectly related and readily available drilling data, mud gas data, and drill cutting images.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method for predicting physical properties of rock. The method includes obtaining digital images of drill cuttings and data on drilling parameters and mud gas content and inputting of the obtained digital images of the drill cuttings to a first trained artificial intelligence model to determine the physical properties of a rock matrix and a lithological composition of the drill cuttings. Further, the physical properties of the rock matrix and the lithological composition of the drill cuttings are determined based on the obtained digital images using the first trained artificial intelligence model and the data on the lithological content of the drill cuttings, the drilling parameters, and the mud gas data are inputted to a second trained artificial intelligence model to determine a total porosity, an effective porosity, and a saturation of rocks at in-situ conditions. Additionally, the method includes determining, using the computer processor, the total porosity, the effective porosity, and the saturation of the rocks at the in-situ conditions based on the lithological content of the drill cuttings, the drilling parameters, and the mud gas using the second trained artificial intelligence model, inputting of the data on the total porosity, the effective porosity, and the saturation of the rocks at the in-situ conditions, and the physical properties of the rock matrix to a rock-physics model to determine the physical properties of the rocks and determining, using the computer processor, the physical properties of the rock.

In general, in one aspect, embodiments disclosed herein relate to a non-transitory computer readable medium storing a set of instructions executable by a computer processor, the set of instructions including the functionality for obtaining digital images of drill cuttings and data on drilling parameters and mud gas content and inputting of the obtained digital images of the drill cuttings to a first trained artificial intelligence model to determine physical properties of a rock matrix and a lithological composition of the drill cuttings. Further, the physical properties of the rock matrix and the lithological composition of the drill cuttings are determined based on the obtained digital images using the first trained artificial intelligence model and the data on the lithological content of the drill cuttings, the drilling parameters, and the mud gas data are inputted to a second trained artificial intelligence model to determine a total porosity, an effective porosity, and a saturation of rocks at in-situ conditions. Additionally, the total porosity, the effective porosity, and the saturation of the rocks at the in-situ conditions are determined based on the lithological content of the drill cuttings, the drilling parameters, and the mud gas using the second trained artificial intelligence model, the data on the total porosity, the effective porosity, and the saturation of the rocks at the in-situ conditions, and the physical properties of the rock matrix are inputted to a rock-physics model to determine the physical properties of the rocks, and the physical properties of the rock are determined.

In general, in one aspect, embodiments disclosed herein relate to a system including a drilling system and a physical properties simulator comprising a computer processor, wherein the physical properties simulator is coupled to the drilling system, the physical properties simulator comprising functionality for obtaining digital images of drill cuttings and data on drilling parameters and mud gas content and inputting of the obtained digital images of the drill cuttings to a first trained artificial intelligence model to determine a physical properties of a rock matrix and a lithological composition of the drill cuttings. Further, the physical properties simulator comprises functionality determining the physical properties of the rock matrix and the lithological composition of the drill cuttings based on the obtained digital images using the first trained artificial intelligence model, inputting of the data on the lithological content of the drill cuttings, the drilling parameters, and the mud gas data to a second trained artificial intelligence model to determine a total porosity, an effective porosity, and a saturation of rocks at in-situ conditions, and determining the total porosity, the effective porosity, and the saturation of the rocks at the in-situ conditions based on the lithological content of the drill cuttings, the drilling parameters, and the mud gas using the second trained artificial intelligence model. Additionally, the physical properties simulator comprises functionality for inputting of the data on the total porosity, the effective porosity, and the saturation of the rocks at the in-situ conditions, and the physical properties of the rock matrix to a rock-physics model to determine the physical properties of the rocks and determining the physical properties of the rock.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

DETAILED DESCRIPTION

Figure 1:
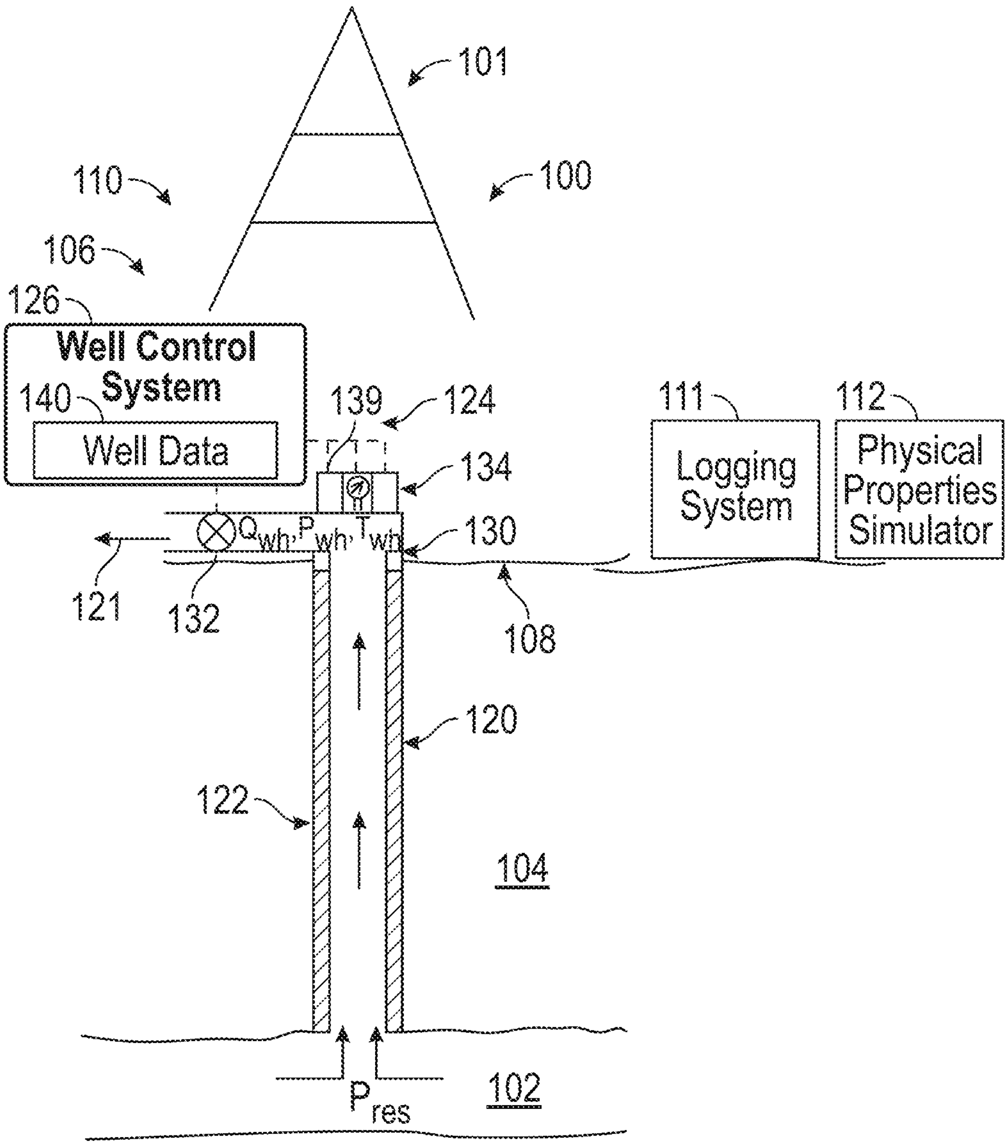
FIG. 1 shows a system in accordance with one or more embodiments.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-4, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and system for determining physical properties of rocks and rock matrix from drilling data, mud gas data, and drill cuttings images. The method determines the physical properties of rocks and rock matrix including bulk density, neutron porosity, compressional and shear wave velocities, photoelectric factor, radioactivity, thermal conductivity, and volumetric heat capacity of rocks. The determination is based on drilling parameters, mud gas data, and drill cuttings images and is determined using both artificial intelligence models and rock physics models.

Further, this disclosure allows predicting the physical properties of rocks and rock matrices within intervals or wells where logging data does not have sufficient quality or where the logging data is not available. Additionally, this disclose reduces the time and the cost needed for well logging. Specifically, the well logging, as well as coring, may be used to obtain an experimental data on the physical properties of rock composing the geological profile of the well.

As such, the well logging is an effective way to register the physical properties of rocks at in-situ conditions covering large intervals and it is usually conducted with relatively high vertical resolution in all wells. However, a full well logging suite may be present only within the target intervals due to economic reasons. Similarly, the coring is also an expensive operation that is typically acquired within a limited number of wells and intervals. Therefore, the data on the physical properties of rocks obtained from laboratory measurements on core samples is representative only for a certain well interval. Further, it is challenging to reconstruct of in situ conditions during the laboratory experiment, which requires a special equipment, experienced engineers, and a high level of metrological control.

However, the drilling operations, the drilling parameters, and the mud gas content are continuously registered. Moreover, the drill cuttings may be recovered and analyzed by geologists to characterize subsurface lithology and geological features of rocks. Specifically, the drill cuttings are small pieces of rock that are produced in drilling process, when the drill bit breaks the rock. The results of the drill cuttings analysis may include, at least, information on mineral composition, grain sizes, porosity, and lithology. The drilling data, the mud gas data, and description of the rock cuttings are related to the physical properties of rocks at in situ conditions. Therefore, this disclosure aims to provide an artificial intelligence and rock physics based solution for determining the physical properties of rocks and rock matrix from the drilling data, the mud gas data, and the drill cutting images.

FIG. 1 shows a schematic diagram in accordance with one or more embodiments. As shown in FIG. 1, a well environment (100) includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath a geological surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a rig (101), a drilling system (110), a logging system (111), a physical properties simulator (112), a wellbore (120), a well sub-surface system (122), a well surface system (124), and a well control system ("control system") (126). The drilling system (110) may include a drill string, a drill bit, and a mud circulation system for use in drilling the wellbore (120) into the formation (104). The logging system (111) may include one or more logging tools, for use in generating well logs, based on the sensing system (134), of the formation (104). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of a computer system (400) described below in FIG. 4 and the accompanying description.

The rig (101) is a combination of equipment used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in situ logging operations).

In some embodiments, during operation of the well system (106), the well control system (126) collects and records well data (140) for the well system (106). During drilling operation of the well (106), the well data (140) may include mud properties, flow rates, drill volume and penetration rates, formation characteristics, etc. To drill a subterranean well or wellbore (120), a drill string (110), including a drill bit and drill collars to weight the drill bit, may be inserted into a pre-drilled hole and rotated to cut into the rock at the bottom of the hole, producing rock cuttings. Commonly, the drilling fluid, or drilling mud, may be utilized during the drilling process. To remove the rock cuttings from the bottom of the wellbore (120), drilling fluid is pumped down through the drill string (110) to the drill bit. The drilling fluid may cool and lubricate the drill bit and provide hydrostatic pressure in the wellbore (120) to provide support to the sidewalls of the wellbore (120). The drilling fluid may also prevent the sidewalls from collapsing and caving in on the drill string (110) and prevent fluids in the downhole formations from flowing into the wellbore (120) during drilling operations. Additionally, the drilling fluid may lift the rock cuttings away from the drill bit and upwards as the drilling fluid is recirculated back to the surface. The drilling fluid may transport rock cuttings from the drill bit to the surface, which can be referred to as "cleaning" the wellbore (120), or hole cleaning.

The rock or drill cuttings are broken bits of solid materials produced as rock or soil is broken apart that must be continuously removed from the borehole during drilling. The cuttings may vary based on the drilling application, and in some instances may include clay (shale), rock, or soil pieces. These pieces often begin to agglomerate, forming a dense slurry that may build up on the drill bit. The increasing use of water-based drilling fluids aggravates bit balling problems, as water from the drilling fluid may be absorbed by the cuttings, exacerbating their tendency to stick to the drill bit. Conventionally, this issue is overcome by increasing viscosity of the drilling fluid to improve the carrying capacity of the drilling fluid in lifting the drill cuttings. However, a more viscous drilling fluid may cause additional friction on the drill pipe, resulting in differential sticking.

In some embodiments, the well data (140) are recorded in real-time, and are available for review or use within seconds, minutes or hours of the condition being sensed (e.g., the measurements are available within 1 hour of the condition being sensed). In such an embodiment, the well data (140) may be referred to as "real-time" well data (140). Real-time well data (140) may enable an operator of the well (106) to assess a relatively current state of the well system (106), and make real-time decisions regarding a development of the well system (106) and the reservoir (102), such as on-demand adjustments in drilling fluid and regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the geological surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable the unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120). The surface sensing system (134) may also include sensors for sensing characteristics of the rig (101), such as bit depth, hole depth, drilling fluid flow, hook load, rotary speed, etc.

In some embodiments, the well system (106) includes the physical properties simulator (112). For example, the physical properties simulator (112) may include hardware and/or software with functionality for generating one or more reservoir models regarding the hydrocarbon-bearing formation (104) and/or performing one or more reservoir simulations. For example, the physical properties simulator (112) may store images and data regarding the drilling cuttings images, the drilling data, and the mud gas data for performing simulations. For this purpose, the simulator may include memory with one or more data structures, such as a buffer, a table, an array, or any other suitable storage medium. The physical properties simulator (112) may further, at least, analyze the drilling cuttings images, the drilling data, and the mud gas data, obtain physical properties of rock matrix, lithological composition, rock porosity, and rock saturation, and/or determine the physical properties of rocks. While physical properties simulator (112) is shown at a well site, in some embodiments, the physical properties simulator (112) is located remotely from well site. In some embodiments, physical properties simulator (112) may include a computer system that is similar to the computer system (400) described below with regard to FIG. 4 and the accompanying description.

Figure 2:
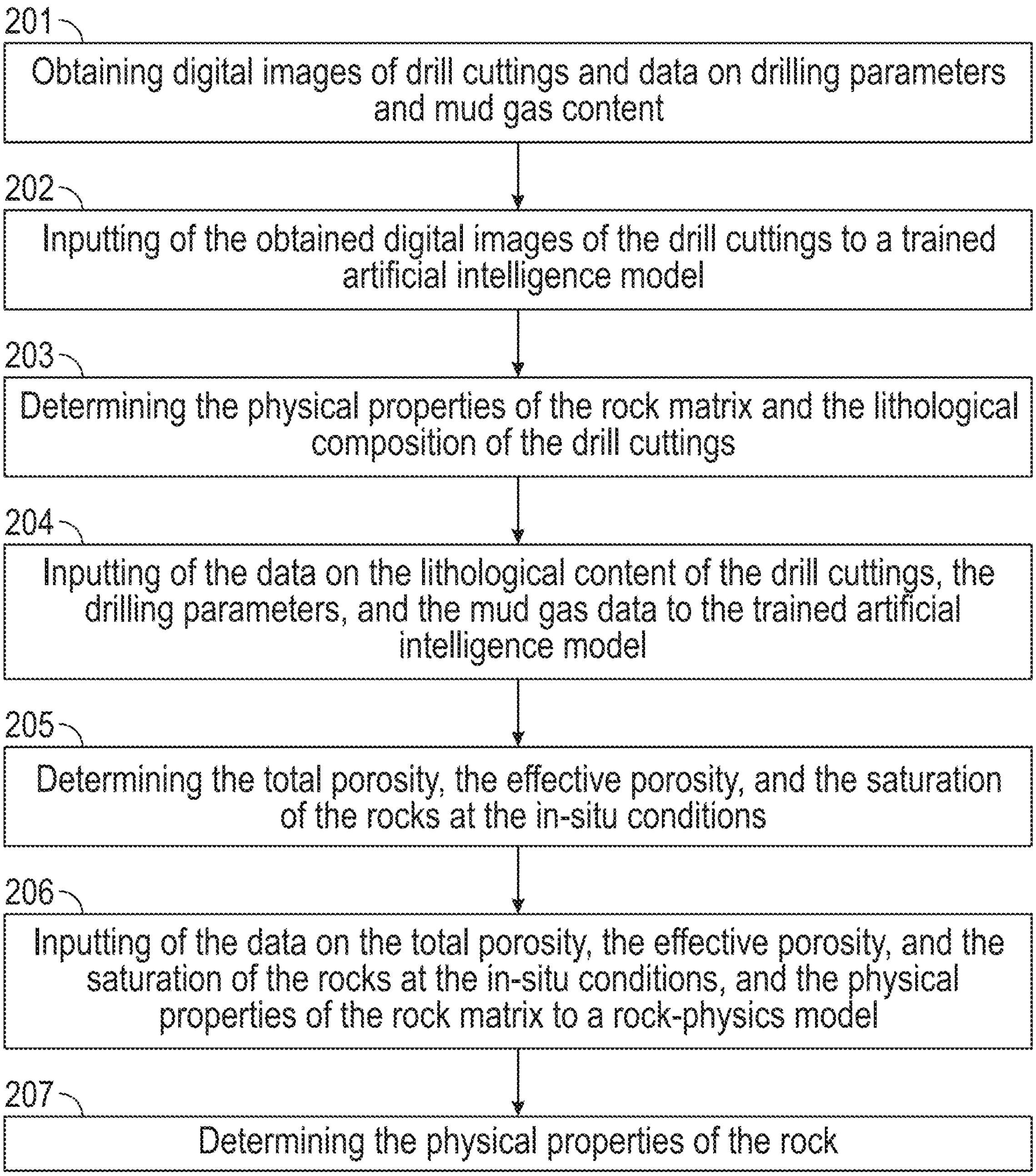
FIG. 2 shows a flowchart in accordance with one or more embodiments.
Figure 3:
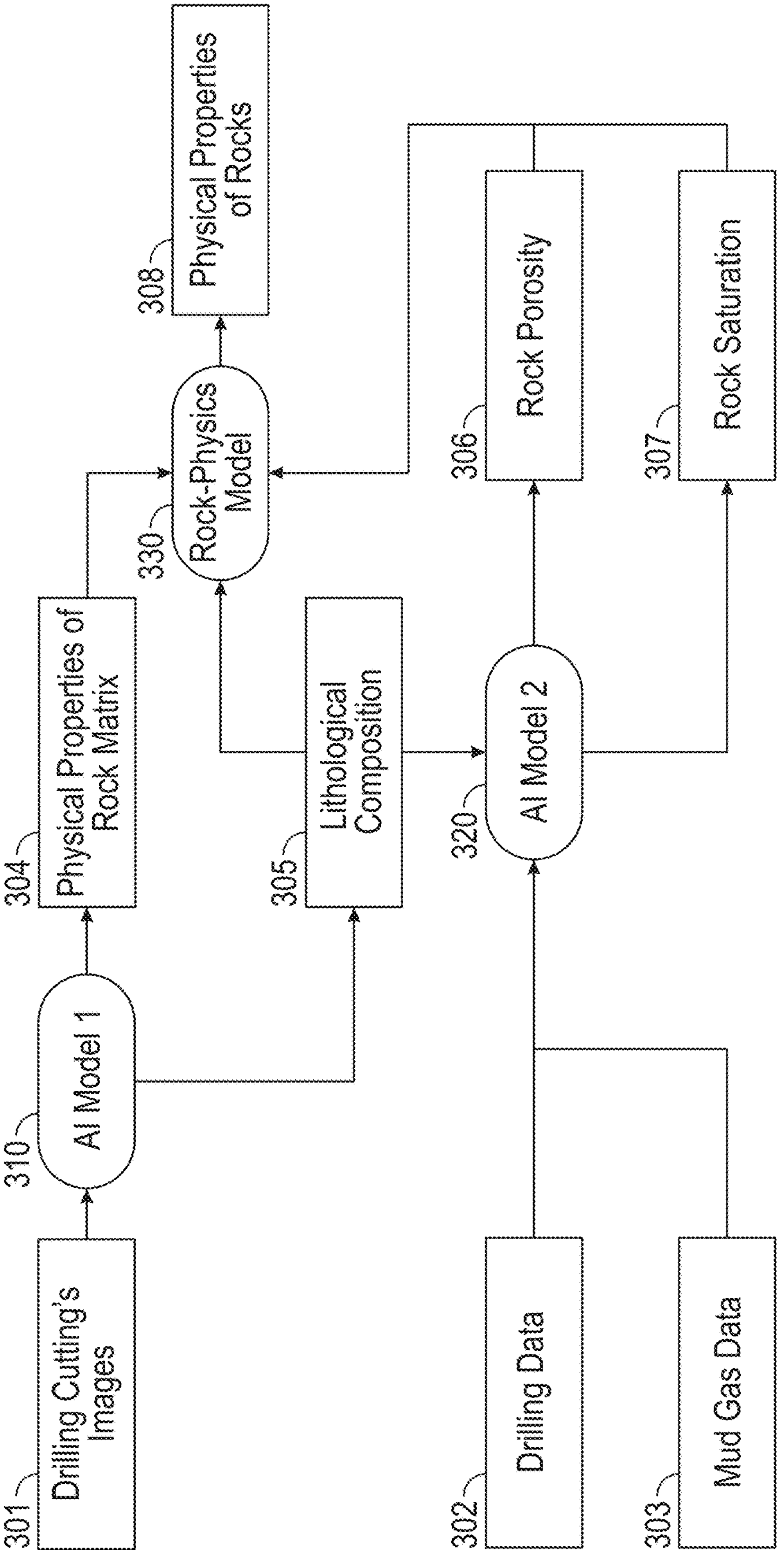
FIG. 3 shows a workflow for determining the physical properties of the rock in accordance with one or more embodiments.

FIG. 2 shows a flowchart in accordance with one or more embodiments for determining physical properties of rocks and rock matrix from drilling data, mud gas data, and drill cuttings images. Specifically, in Block 201, digital images of drill cuttings (301), data on drilling parameters (302), and data on mud gas content (303) are obtained in real-time. In one or more embodiments the data on drilling parameters (302) and the data on mud gas content (303) may be obtained in real-time. As shown on FIG. 3, digital images of drill cutting (301), data on drilling parameters (302), and data on mud gas content (303) are the building blocks of this process. The high-quality digital images (301) of drill cuttings are obtained during the drilling process, for example, via digital cameras placed within the drill string or in the wellbore/annulus. Additionally, the drilling parameters (302) and the mud gas content data (303) are registered during drilling. The drilling parameters (302) include, at least, a torque on a bit, a weight on the bit, a hook load, revolutions per minute, a rate of penetration, an input flow rate, an output flow rate, a temperature and density of drilling mud, a standpipe pressure, and a total pit volume. In one or more embodiments, the images of drill cuttings, data on drilling parameters, and mud gas data may be obtained simultaneously during drilling operations, in real-time. In other embodiments, the images of drill cuttings, data on drilling parameters, and mud gas data may be obtained sequentially or immediately after drilling operations are performed.

Further, in Block 202, the obtained digital images of the drill cuttings (301) are inputted to a first trained artificial intelligence (AI) model (310). As used herein, AI includes machine learning algorithms. In some embodiments, the physical properties simulator includes hardware and/or software with functionality for generating and/or updating one or more machine-learning models to determine the physical properties of rocks. Examples of machine-learning models may include artificial neural networks, such as convolutional neural networks, deep neural networks, and recurrent neural networks. Machine-learning models may also include support vector machines, decision trees, inductive learning models, deductive learning models, supervised learning models, unsupervised learning models, reinforcement learning models, etc. The machine learning models used in this disclosure may be, for example at least, ResNET, Xception, VGG16, DenseNET, and EfficientNET. In a deep neural network, for example, a layer of neurons may be trained on a predetermined list of features based on the previous network layer's output. Thus, as data progresses through the deep neural network, more complex features may be identified within the data by neurons in later layers. Likewise, a U-net model or other type of convolutional neural network model may include various convolutional layers, pooling layers, fully connected layers, and/or normalization layers to produce a particular type of output. Thus, convolution and pooling functions may be the activation functions within a convolutional neural network.

In some embodiments, two or more different types of machine-learning models are integrated into a single machine-learning architecture, e.g., a machine-learning model may include support vector machines and neural networks. In some embodiments, the physical properties simulator may generate augmented data or synthetic data to produce a large amount of interpreted data for training a particular model. In some embodiments, various types of machine learning algorithms may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model.

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the artificial neural network. Likewise, these weighted data inputs may be summed such that this sum is communicated through a neuron's activation function to other hidden layers within the artificial neural network. As such, the activation function may determine whether and to what extent an output of a neuron progresses to other neurons where the output may be weighted again for use as an input to the next hidden layer.

In one or more embodiments, the first trained artificial intelligence model for the analysis of the obtained digital images of the drill cuttings (301) is a convolutional neural network (CNN). The convolutional neural network model is used for the analysis of images. This model assigns weights to different aspects and characteristics of an image. The weights are used as inputs and they are analyzed through various layers of this model. Based on the analysis, the model identifies the object.

In this case, in Block 203 the convolutional neural network is used to determine the content of the rock-forming components, such as mineral or lithological constituents (305) and to determine the physical properties of rock matrix (304). For exemplary purposes, the density of the rock matrix may be calculated as follows:

$$\rho_{matrix}=\rho_{shale}*V_{shale}+\rho_{limestone}*V_{limestone} \quad \text{Equation (1)}$$

Where density is denoted with ρ and volume is denoted with V. The calculations are based on the lithological composition of the rock, such as, at least, the limestone and shale. The physical properties of the rock matrix (304) include, at least, a natural radioactivity, a density, a neutron porosity, a compressional wave velocity, a shear wave velocity, a photoelectric factor, a thermal conductivity, and a volumetric heat capacity, some of which are shown for example in Table 1. Additionally in Block 203, the shale content is calculated as a sum of all clay minerals. Specifically, the shale content is a prerequired input parameter during assessment of effective rock porosity.

TABLE 1

| Physical properties of rock matrix | | | |
|---|---|---|---|
| Depth | Density | Sonic velocity | . . . |
| 200 | 2.70 | 42 | . . . |
| 201 | 2.65 | 50 | |
| . . . | . . . | . . . | . . . |

In Block 204, the data on lithological content of the drilling (305), the drilling parameters (302), and the mud gas data (303) are inputted to a second trained artificial intelligence model (320). The lithological content of the drilling (305) contains information regarding the properties of, at least, shale and limestone, as shown in Table 2. In one or more embodiments, the second artificial intelligence model (320) for the analysis of the data on lithological content of the drilling (305), the drilling parameters (302), and the mud gas data (303) may be a trained ensemble tree-based regression model. The machine learning models used in this disclosure may be for example, XGBoost, Catboost, and LightGBM.

TABLE 2

| Lithological composition | | |
|---|---|---|
| Depth | Limestone | Shale |
| 200 | 0.80 | 0.20 |
| 201 | 0.65 | 0.35 |
| . . . | . . . | . . . |

Further, in Block 205 the second trained ensemble tree-based regression model uses the data on lithological content of the drilling (305), the drilling parameters (302), and the mud gas data (303) to determine a rock porosity (306) and a rock saturation (307), including a total porosity and an effective porosity. The rock porosity (306) represents the percentage of void space in the rock. Specifically, rock porosity (306) is defined as the ratio of the volume of the void or pore space over the total volume of the rock. Further, the rock saturation (307) represents the percentage of the void space that is occupied by a certain fluid or gas.

Tables 3 and 4 below show examples of rock porosity and rock saturation values at various depths. Rock saturation is broken down into oil, gas, and water values, for example. In Block 206, the porosity data (306), the rock saturation data (307) (as shown in Tables 3 and 4) at the in-situ conditions, the physical properties of the rock matrix (304), and lithological composition of the drill cuttings (305) are inputted into a rock-physics model (330). The rock-physics modelling is comprised of, at least, two types of physical properties such as a scalar and a tensorial physical property. The scalar and the tensorial physical property does not depend on the rock structure, texture, grain shapes, etc. Additionally, tensorial physical properties, such as, at least, electrical and thermal conductivity, sonic velocity, permeability, geomechanical moduli, are functions of pore space structure, shape of grains, cementation, saturation, chemical property of grain surface. Therefore, many rock types exhibit anisotropy when measuring tensorial physical properties. The usage of the rock physics model is a mathematical formalization of the dependency of tensorial physical property from its structure and shape of grains. It means, that having the information of content of rock-forming component, it's properties and saturation, we can calculate physical property.

TABLE 3

| Rock porosity | |
|---|---|
| Depth | Porosity |
| 200 | 0.25 |
| 201 | 0.15 |
| . . . | . . . |

TABLE 4

| Rock saturation | | | |
|---|---|---|---|
| Depth | Oil | Water | Gas |
| 200 | 0.25 | 0.6 | 0.15 |
| 201 | 0.15 | 0.75 | 0.10 |
| . . . | . . . | | |

Additionally, in Block 207, the rock-physics model is used to determine the physical properties of the rocks. The physical properties of the rock include the natural radioactivity, the density, the neutron porosity, the compressional velocity and the shear wave velocity, the photoelectric factor, the thermal conductivity, and the volumetric heat capacity of rocks within the target interval of the well, as shown in Table 5. For exemplary purposes, the density may be calculated as follows:

$$\rho_{rock} = \rho_{matrix} * (1 - \phi) + \rho_{fluid} * \phi \quad \text{Equation (2)}$$

Where the porosity of the rock is denoted with $\phi$.

TABLE 5

Physical properties of rocks

| Depth | Density | Sonic velocity | . . . |
|---|---|---|---|
| 200 | 2.70 | 42 | . . . |
| 201 | 2.65 | 50 | |
| . . . | . . . | . . . | . . . |

Specifically, rocks are composed of rock matrix and porous space that are filled with some fluids, such as hydrocarbons or water. Therefore, physical property of rock is a function of physical properties of rock matrix and pore-filling fluids. The data on physical properties of rocks are valuable since it allows calculation of physical properties at different saturations. In one or more embodiments, as part of Block 207, sonic velocities and thermal conductivity of rocks are determined accounting for thermal anisotropy.

In one or more embodiments, the analysis of drill cuttings provides information on lithological composition of rocks. The drilling data are indirectly related to geomechanical characteristics of rocks. The mud logging data is an indicator of in situ saturation of rocks. Thus, embodiments described herein use lithological composition (inferred from cuttings), drilling, and mud gas data to reconstruct physical properties of rocks at in situ conditions by means of AI and rock-physics modeling. This method provides an extended functionality, which includes determining physical properties of rocks and rock matrix (including natural radioactivity, density, neutron porosity, compressional and shear wave velocities, photoelectric factor, thermal conductivity, and volumetric heat capacity) accounting for anisotropy, effective rock porosity, and lithological content of rocks.

Figure 4:
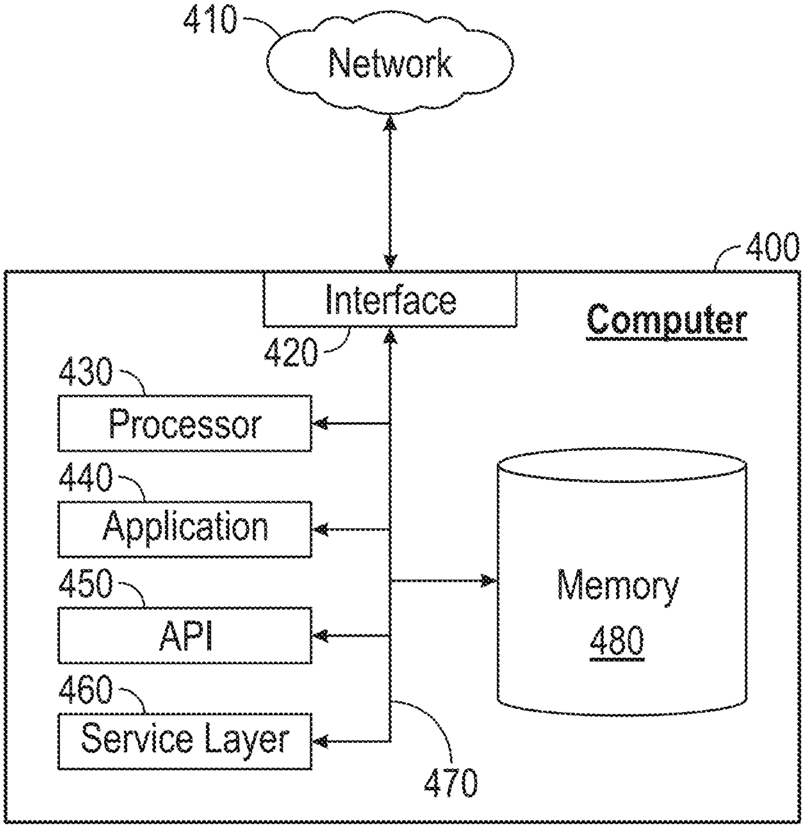
FIG. 4 shows a computer system in accordance with one or more embodiments.

Embodiments may be implemented on a any suitable computing device, such as the computer system shown in FIG. 4. Specifically, FIG. 4 is a block diagram of a computer system (400) used to provide computational functionalities associated with described algorithms, methods, functions, processes, flows, and procedures as described in the instant disclosure, according to an implementation. The illustrated computer (400) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (400) may include a computer that includes an input device, such as a keypad, keyboard, touch screen, or other device that can accept user information, and an output device that conveys information associated with the operation of the computer (400), including digital data, visual, or audio information (or a combination of information), or a GUI.

The computer (400) can serve in a role as a client, network component, a server, a database or other persistency, or any other component (or a combination of roles) of a computer system for performing the subject matter described in the instant disclosure. The illustrated computer (400) is communicably coupled with a network (410). In some implementations, one or more components of the computer (400) may be configured to operate within environments, including cloud-computing-based, local, global, or other environment (or a combination of environments).

At a high level, the computer (400) is an electronic computing device operable to receive, transmit, process, store, or manage data and information associated with the described subject matter. According to some implementations, the computer (400) may also include or be communicably coupled with an application server, e-mail server, web server, caching server, streaming data server, business intelligence (BI) server, or other server (or a combination of servers).

The computer (400) can receive requests over network (410) from a client application (for example, executing on another computer (400) and responding to the received requests by processing the said requests in an appropriate software application. In addition, requests may also be sent to the computer (400) from internal users (for example, from a command console or by other appropriate access method), external or third-parties, other automated applications, as well as any other appropriate entities, individuals, systems, or computers.

Each of the components of the computer (400) can communicate using a system bus (470). In some implementations, any or all of the components of the computer (400), both hardware or software (or a combination of hardware and software), may interface with each other or the interface (420) (or a combination of both) over the system bus (470) using an application programming interface (API) (450) or a service layer (460) (or a combination of the API (450) and service layer (460). The API (450) may include specifications for routines, data structures, and object classes. The API (450) may be either computer-language independent or dependent and refer to a complete interface, a single function, or even a set of APIs. The service layer (460) provides software services to the computer (400) or other components (whether or not illustrated) that are communicably coupled to the computer (400). The functionality of the computer (400) may be accessible for all service consumers using this service layer. Software services, such as those provided by the service layer (460), provide reusable, defined business functionalities through a defined interface. For example, the interface may be software written in JAVA, C++, or other suitable language providing data in extensible markup language (XML) format or other suitable format. While illustrated as an integrated component of the computer (400), alternative implementations may illustrate the API (450) or the service layer (460) as stand-alone components in relation to other components of the computer (400) or other components (whether or not illustrated) that are communicably coupled to the computer (400). Moreover, any or all parts of the API (450) or the service layer (460) may be implemented as child or sub-modules of another software module, enterprise application, or hardware module without departing from the scope of this disclosure.

The computer (400) includes an interface (420). Although illustrated as a single interface (420) in FIG. 4, two or more interfaces (420) may be used according to particular needs, desires, or particular implementations of the computer (400). The interface (420) is used by the computer (400) for communicating with other systems in a distributed environment that are connected to the network (410). Generally, the interface (420 includes logic encoded in software or hardware (or a combination of software and hardware) and operable to communicate with the network (410). More specifically, the interface (420) may include software supporting one or more communication protocols associated with communications such that the network (410) or interface's hardware is operable to communicate physical signals within and outside of the illustrated computer (400).

The computer (400) includes at least one computer processor (430). Although illustrated as a single computer processor (430) in FIG. 4, two or more processors may be used according to particular needs, desires, or particular implementations of the computer (400). Generally, the computer processor (430) executes instructions and manipulates data to perform the operations of the computer (400) and any algorithms, methods, functions, processes, flows, and procedures as described in the instant disclosure.

The computer (400) also includes a memory (480) that holds data for the computer (400) or other components (or a combination of both) that can be connected to the network (410). For example, memory (480) can be a database storing data consistent with this disclosure. Although illustrated as a single memory (480) in FIG. 4, two or more memories may be used according to particular needs, desires, or particular implementations of the computer (400) and the described functionality. While memory (480) is illustrated as an integral component of the computer (400), in alternative implementations, memory (480) can be external to the computer (400).

The application (440) is an algorithmic software engine providing functionality according to particular needs, desires, or particular implementations of the computer (400), particularly with respect to functionality described in this disclosure. For example, application (440) can serve as one or more components, modules, applications, etc. Further, although illustrated as a single application (440), the application (440) may be implemented as multiple applications (440) on the computer (400). In addition, although illustrated as integral to the computer (400), in alternative implementations, the application (440) can be external to the computer (400).

There may be any number of computers (400) associated with, or external to, a computer system containing computer (400), each computer (400) communicating over network (410). Further, the term "client," "user," and other appropriate terminology may be used interchangeably as appropriate without departing from the scope of this disclosure. Moreover, this disclosure contemplates that many users may use one computer (400), or that one user may use multiple computers (400).

In some embodiments, the computer (400) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (Saas), mobile "backend" as a service (MBaaS), serverless computing, artificial intelligence (AI) as a service (AlaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for predicting physical properties of rock, comprising:

obtaining digital images of drill cuttings and data on drilling parameters and mud gas content;

inputting of the obtained digital images of the drill cuttings to a first trained artificial intelligence model to determine the physical properties of a rock matrix and a lithological composition of the drill cuttings;

determining, using a computer processor, the physical properties of the rock matrix and the lithological composition of the drill cuttings based on the obtained digital images using the first trained artificial intelligence model;

inputting of the data on the lithological content of the drill cuttings, the drilling parameters, and the mud gas data to a second trained artificial intelligence model to determine a total porosity, an effective porosity, and a saturation of rocks at in-situ conditions;

determining, using the computer processor, the total porosity, the effective porosity, and the saturation of the rocks at the in-situ conditions based on the lithological content of the drill cuttings, the drilling parameters, and the mud gas using the second trained artificial intelligence model;

inputting of the data on the total porosity, the effective porosity, and the saturation of the rocks at the in-situ conditions, and the physical properties of the rock matrix to a rock-physics model to determine the physical properties of the rocks; and determining, using the computer processor, the physical properties of the rock, wherein a wellbore path is determined based, at least in part, on the determined physical properties of the rock, and wherein the wellbore path is drilled using a drilling system.

2. The method of claim 1, wherein the physical properties of the rock include a natural radioactivity, a density, a neutron porosity, a compressional wave velocity, a shear wave velocity, a photoelectric factor, a thermal conductivity, and a volumetric heat capacity.

3. The method of claim 1, wherein the drilling parameters include a torque on a bit, a weight on the bit, a hook load, revolutions per minute, a rate of penetration, an input flow rate, an output flow rate, a temperature of drilling mud, a density of the drilling mud, a standpipe pressure, and a total pit volume.

4. The method of claim 1, wherein the first trained artificial intelligence model used to determine the physical properties of the rock matrix and the lithological composition of the drill cuttings is a convolutional neural network.

5. The method of claim 1, wherein the second trained artificial intelligence model used to determine the total porosity, the effective porosity, and the saturation of the rocks at the in-situ conditions, and the physical properties of the rock is an ensemble-based regression algorithm.

6. A non-transitory computer readable medium storing instructions executable by a computer processor, the instructions comprising functionality for:

obtaining digital images of drill cuttings and data on drilling parameters and mud gas content;

inputting of the obtained digital images of the drill cuttings to a first trained artificial intelligence model to determine physical properties of a rock matrix and a lithological composition of the drill cuttings;

determining the physical properties of the rock matrix and the lithological composition of the drill cuttings based on the obtained digital images using the first trained artificial intelligence model;

inputting of the data on the lithological content of the drill cuttings, the drilling parameters, and the mud gas data to a second trained artificial intelligence model to determine a total porosity, an effective porosity, and a saturation of rocks at in-situ conditions;

determining the total porosity, the effective porosity, and the saturation of the rocks at the in-situ conditions based on the lithological content of the drill cuttings, the drilling parameters, and the mud gas using the second trained artificial intelligence model;

inputting of the data on the total porosity, the effective porosity, and the saturation of the rocks at the in-situ conditions, and the physical properties of the rock matrix to a rock-physics model to determine the physical properties of the rocks; and determining the physical properties of the rock, wherein a wellbore path is determined based, at least in part, on the determined physical properties of the rock.

7. The non-transitory computer readable medium of claim 6, wherein the physical properties of the rock include a natural radioactivity, a density, a neutron porosity, a compressional wave velocity, a shear wave velocity, a photoelectric factor, a thermal conductivity, and a volumetric heat capacity.

8. The non-transitory computer readable medium of claim 6, wherein the drilling parameters include a torque on a bit, a weight on the bit, a hook load, revolutions per minute, a rate of penetration, an input flow rate, an output flow rate, a temperature of drilling mud, a density of the drilling mud, a standpipe pressure, and a total pit volume.

9. The non-transitory computer readable medium of claim 6, wherein the first trained artificial intelligence model used to determine the physical properties of the rock matrix and the lithological composition of the drill cuttings is a convolutional neural network.

10. The non-transitory computer readable medium of claim 6, wherein the second trained artificial intelligence model used to determine the total porosity, the effective porosity, and the saturation of the rocks at the in-situ conditions, and the physical properties of the rock is an ensemble-based regression algorithm.

11. A system comprising:

a physical properties simulator comprising a computer processor, wherein the physical properties simulator is coupled to the drilling system, the physical properties simulator comprising functionality for:

obtaining digital images of drill cuttings and data on drilling parameters and mud gas content;

inputting of the obtained digital images of the drill cuttings to a first trained artificial intelligence model to determine a physical properties of a rock matrix and a lithological composition of the drill cuttings;

determining the physical properties of the rock matrix and the lithological composition of the drill cuttings based on the obtained digital images using the first trained artificial intelligence model;

inputting of the data on the lithological content of the drill cuttings, the drilling parameters, and the mud gas data to a second trained artificial intelligence model to determine a total porosity, an effective porosity, and a saturation of rocks at in-situ conditions;

determining the total porosity, the effective porosity, and the saturation of the rocks at the in-situ conditions based on the lithological content of the drill cuttings, the drilling parameters, and the mud gas using the second trained artificial intelligence model;

inputting of the data on the total porosity, the effective porosity, and the saturation of the rocks at the in-situ conditions, and the physical properties of the rock matrix to a rock-physics model to determine the physical properties of the rocks; and determining the physical properties of the rock, wherein a wellbore path is determined based, at least in part, on the determined physical properties of the rock, and a drilling system configured to drill the wellbore path.

12. The system of claim 11, wherein the physical properties of the rock include a natural radioactivity, a density, a neutron porosity, a compressional wave velocity, a shear wave velocity, a photoelectric factor, a thermal conductivity, and a volumetric heat capacity.

13. The system of claim 11, wherein the drilling parameters include a torque on a bit, a weight on the bit, a hook load, revolutions per minute, a rate of penetration, an input flow rate, an output flow rate, a temperature of drilling mud, a density of the drilling mud, a standpipe pressure, and a total pit volume.

14. The system of claim 11, wherein the first trained artificial intelligence model used to determine the physical properties of the rock matrix and the lithological composition of the drill cuttings is a convolutional neural network.

15. The system of claim 11, wherein the second trained artificial intelligence model used to determine the total porosity, the effective porosity, and the saturation of the rocks at the in-situ conditions, and the physical properties of the rock is an ensemble-based regression algorithm.

* * * * *